United States Patent
Noda et al.

(10) Patent No.: US 10,491,882 B2
(45) Date of Patent: Nov. 26, 2019

(54) CALIBRATION METHOD AND CALIBRATION TOOL OF CAMERA

(71) Applicant: Seiko Epson Corporation, Tokyo (JP)

(72) Inventors: Takahiko Noda, Azumino (JP); Mitsuhiro Inazumi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/048,854

(22) Filed: Jul. 30, 2018

(65) Prior Publication Data
US 2019/0037204 A1    Jan. 31, 2019

(30) Foreign Application Priority Data
Jul. 31, 2017 (JP) .................... 2017-147585

(51) Int. Cl.
| | |
|---|---|
| *H04N 7/18* | (2006.01) |
| *H04N 13/246* | (2018.01) |
| *H04N 5/247* | (2006.01) |
| *H04N 13/239* | (2018.01) |

(52) U.S. Cl.
CPC .......... *H04N 13/246* (2018.05); *H04N 5/247* (2013.01); *H04N 13/239* (2018.05)

(58) Field of Classification Search
CPC ..... H04N 13/246; H04N 13/239; H04N 5/247

USPC ............. 348/135, 137, 139, 140, 143, 151; 386/223, 224
See application file for complete search history.

(56) References Cited

U.S. PATENT DOCUMENTS

| | | | |
|---|---|---|---|
| 9,393,694 B2 | 7/2016 | Wallack et al. | |
| 2016/0353083 A1* | 12/2016 | Aoki | .................... H04N 13/246 |
| 2017/0322048 A1* | 11/2017 | Yoshida | .................. G01C 3/00 |

FOREIGN PATENT DOCUMENTS

| | | |
|---|---|---|
| JP | 2013-526423 A | 6/2013 |
| WO | WO-2011-143576 A2 | 11/2011 |

\* cited by examiner

*Primary Examiner* — Robert Chevalier
(74) *Attorney, Agent, or Firm* — Harness, Dickey & Pierce, P.L.C.

(57) ABSTRACT

A calibration method for calibrating a first camera and a second camera which are different in at least one of an angle of view and a focal length includes capturing images which include a calibration tool having a first pattern configured with a plurality of first marks and a second pattern configured with a plurality of second marks, different in at least one of a shape between the first mark and the second mark, a size between the first mark and the second mark, and arrangement between the first marks and the second marks, by the first camera and the second camera, and calibrating the first camera and the second camera using patterns corresponding respectively to the first camera and the second camera.

12 Claims, 4 Drawing Sheets

CALIBRATION METHOD AND CALIBRATION TOOL OF CAMERA

BACKGROUND

1. Technical Field

The present invention relates to calibration of a plurality of cameras.

2. Related Art

In calibration of a camera, a calibration plate on which a calibration pattern is displayed may be used. In JP-T-2013-526423, a method of calibrating a plurality of cameras using the calibration plate is disclosed.

However, in the related art, sufficient consideration has not been made on a case of calibrating the plurality of cameras in which at least one of an angle of view and a focal length is different. For that reason, in order to prepare a calibration pattern suitable for each camera, there is a problem that calibration work becomes complicated by replacing the calibration plate. For that reason, a technique that does not complicate calibration work for calibration of a plurality of cameras is demanded.

SUMMARY

An advantage of some aspects of the invention is to solve at least a part of the problems described above, and the invention can be implemented as the following forms.

(1) According to a first aspect of the invention, a calibration method for calibrating a first camera and a second camera which are different in at least one of an angle of view and a focal length is provided. The calibration method includes capturing images which include a calibration tool having a first pattern including a plurality of first marks, and a second pattern including a plurality of second marks, different in at least one of a shape of the first mark and a shape of the second mark, a size of the first mark and a size of the second mark, and arrangement of the first marks, and arrangement of the second marks, by the first camera and the second camera, and calibrating the first camera and the second camera using patterns of the images corresponding respectively to the first camera and the second camera. According to the calibration method, in a case of calibrating the first camera and the second camera which are different in at least one of the angle of view and the focal length, calibration work may be performed without replacing a calibration plate for each camera. Accordingly, complication of the calibration work may be suppressed.

(2) In the calibration method, the first pattern and the second pattern may be formed such that the shape of the first mark and the shape of the second mark are the same and the size of the first mark is different from the size of the second mark. According to the calibration method, it is possible for each camera to discriminate between patterns used for calibration by discriminating the patterns based on the size of the mark by the camera.

(3) In the calibration method, the first pattern and the second pattern may be formed such that arrangement of the first marks is different from the arrangement of the second marks. According to the calibration method, it is possible for each camera to discriminate between patterns used for calibration by discriminating the patterns based on the arrangement of marks by the camera.

(4) In the calibration method, the first pattern and the second pattern may be formed on the same surface among the surfaces of the calibration tool. According to the calibration method, since the first pattern and the second pattern may be imaged without changing the surface of the calibration tool, imaging work of the first pattern and the second pattern may be simplified.

(5) In the calibration method, first rectangular region circumscribing the first pattern and a second rectangular region circumscribing the second pattern may be disposed so as to partially overlap each other. According to the calibration method, as compared with a calibration method using a calibration tool on which the first rectangular region and the second rectangular region are arranged so as not to overlap each other, an area occupied by the first pattern and the second pattern among the surfaces constituting the calibration tool may be reduced.

(6) In the calibration method, the first pattern and the second pattern may be formed on different surfaces among the surfaces of the calibration tool. According to the calibration method, since the first pattern and the second pattern are formed separately on different surfaces, the calibration of the first camera and the second camera may be dealt with by changing the surface of the calibration tool imaged on the camera according to the camera to be calibrated.

(7) According to a second aspect of the invention, a calibration tool used in the calibration method described above is provided. According to the calibration tool, complication of calibration work may be suppressed.

The invention may be realized in various aspects other than those described above. For example, the invention maybe realized in an aspect of a computer program for realizing functions of a camera calibration device having a calibration tool and a camera calibration method, an aspect of a non-transitory storage medium in which the computer program is recorded, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
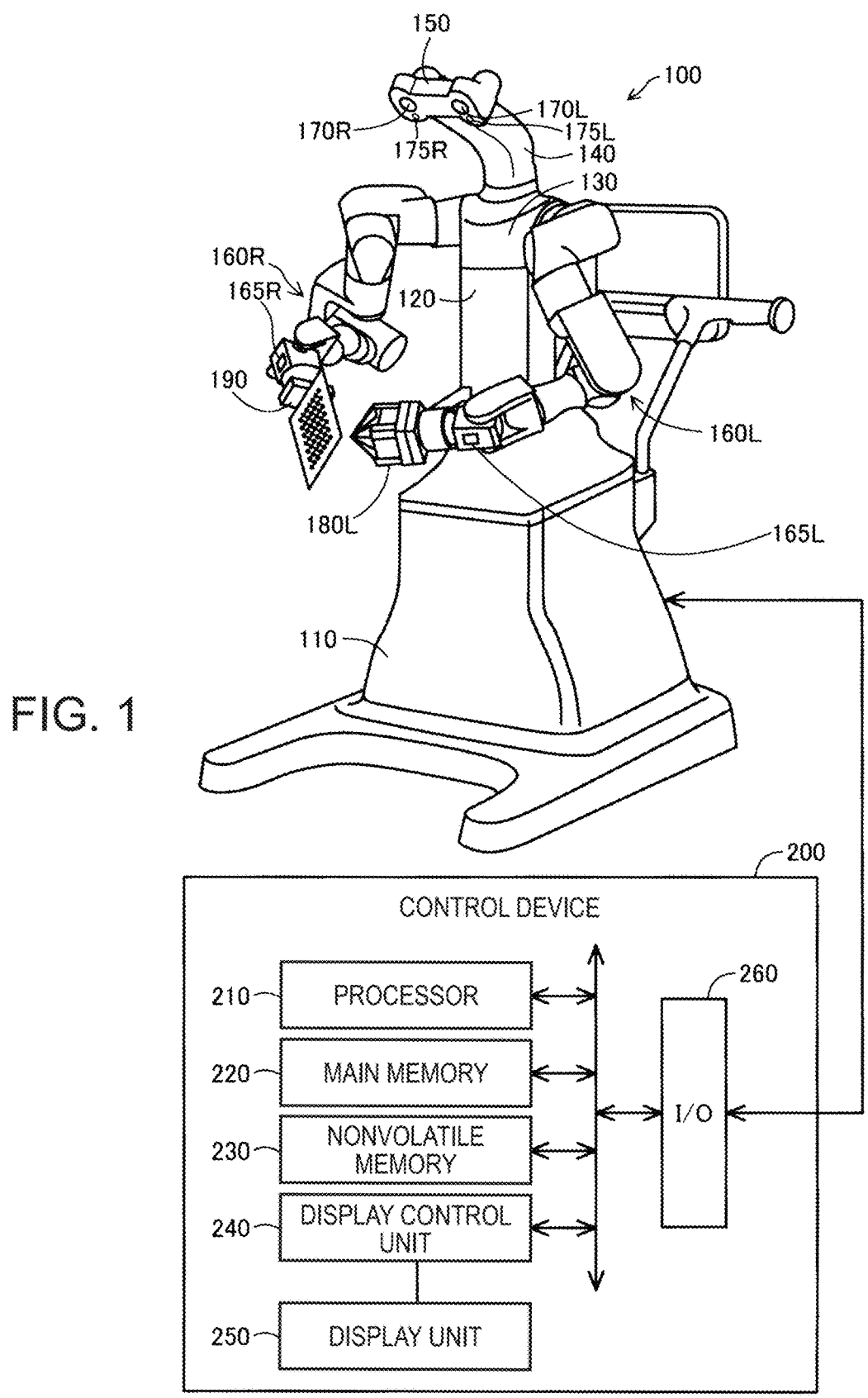
FIG. 1 is a conceptual diagram of a robot system that executes a calibration method according to a first embodiment.

FIG. 1 is a conceptual diagram of a robot system that executes a calibration method of a first embodiment. The robot system includes a robot 100 and a control device 200. The robot 100 is an autonomous robot capable of performing work while autonomously determining the work by recognizing a work target with cameras 170L, 170R, 175L, 175R, 165R, and 165L and freely adjusting the force. The robot 100 can operate as a teaching playback robot that executes work in accordance with prepared teaching data.

The robot 100 includes a base 110, a body portion 120, a shoulder portion 130, a neck portion 140, a head portion 150, and two arms 160L and 160R. A hand 180L and a calibration tool 190 are detachably attached to the arms 160L and 160R. A calibration tool 190 is a camera calibration tool provided with patterns P1, P2, and P3 to be described later. The hand 180L is an end effector that grips a workpiece or a tool.

Cameras 170L, 170R, 175L, and 175R are installed on the head portion 150. The cameras 170L and 170R are global cameras having a wide angle of view for photographing a work table. The cameras 175L and 175R are macro cameras having a narrow angle of view for photographing the work table. These cameras 170L, 170R, 175L, and 175R are provided independently of the arms 160L and 160R and are fixed cameras of which the position and attitude do not change.

Cameras 165R and 165L are installed on the arms 160L and 160R. The cameras 165R and 165L are hand-eye cameras for photographing a work target or the like placed on the work table.

The cameras 170L and 170R, the cameras 175L and 175R, and the cameras 165R and 165L are cameras with different angles of view and focal lengths, respectively. In another embodiment, the cameras used in the calibration method of the first embodiment may be a plurality of cameras in which at least one of the angle of view and the focal length is different.

The letters "L" and "R" attached at the end of the reference numerals of the arms 160L and 160R and the cameras 170L and 170R mean "left" and "right", respectively. In a case where the distinctions between the arms 160L and 160R and the cameras 170L and 170R are not needed, explanation will be made using the symbols in which the letters "L" and "R" are omitted.

A control device 200 includes a processor 210, a main memory 220, a nonvolatile memory 230, a display control unit 240, a display unit 250, and an I/O interface 260. These components are connected via a bus. The processor 210 is, for example, a microprocessor or a processor circuit. The control device 200 is connected to the robot 100 via the I/O interface 260. The control device 200 may be accommodated inside the robot 100.

As a configuration of the control device 200, various configurations other than the configuration illustrated in FIG. 1 can be adopted. For example, the processor 210 and the main memory 220 may be deleted from the control device 200 of FIG. 1, and the processor 210 and the main memory 220 may be provided in another device communicably connected to the control device 200. In this case, the entire device including the other device and the control device 200 functions as a control device of the robot 100. In another embodiment, the control device 200 may include two or more processors 210. In still another embodiment, the control device 200 may be realized by a plurality of devices communicably connected to each other. In these various embodiments, the control device 200 is configured as a device or group of devices including one or more processors 210.

Figure 2:
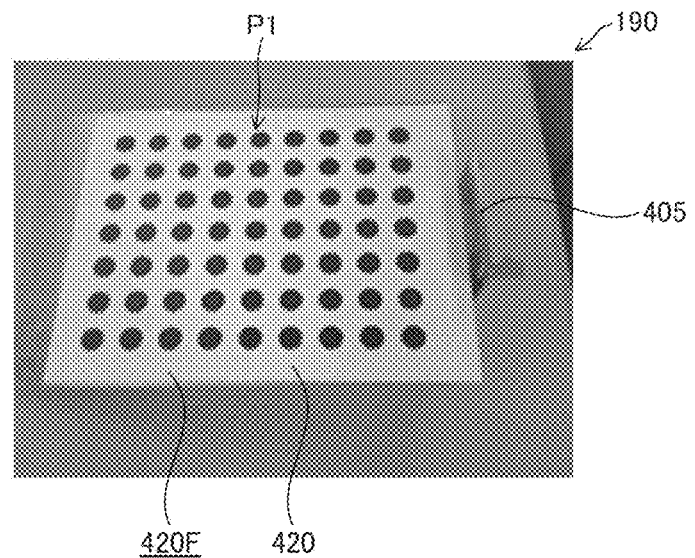
FIG. 2 is a view illustrating an image obtained by photographing a calibration tool from one side.
Figure 3:
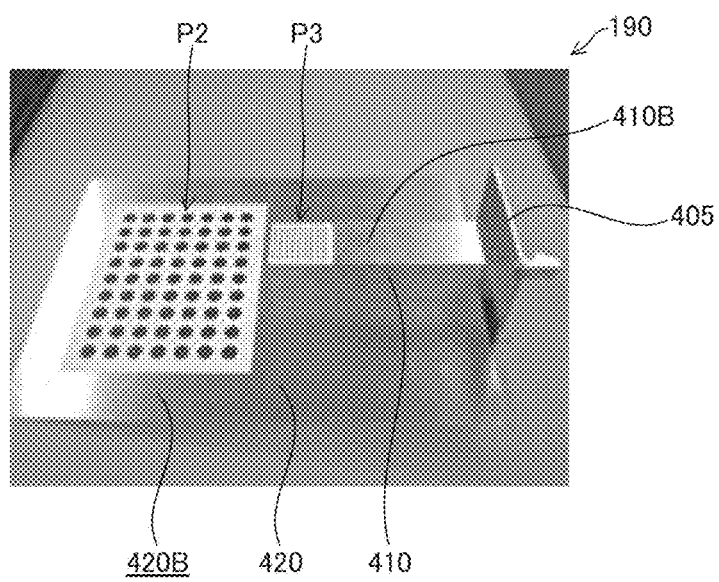
FIG. 3 is a view illustrating an image obtained by photographing the calibration tool from the other side.

FIG. 2 is a view illustrating an image obtained by photographing the calibration tool 190 from one side. FIG. 3 is a view illustrating an image obtained by photographing the calibration tool 190 from the other side. The calibration tool 190 includes a joint portion 405, a rod-like member 410, and a plate-like member 420.

The joint portion 405 is engaged with the end of the arm 160 and connects the calibration tool 190 to the arm 160. The joint portion 405 is formed integrally with the rod-like member 410 and the plate-like member 420. The plate-like member 420 has a front surface 420F and a back surface 420B. On the surface 420F, a pattern P1 is formed. On the back surface 420B, a pattern P2 is formed. A pattern P3 is formed on a surface 410B that faces the same direction as the back surface 420B among surfaces constituting the rod-like member 410.

The patterns P1, P2, and P3 are patterns composed of a plurality of marks. The patterns P1, P2, and P3 have marks of which shapes are the same circular shape and sizes thereof are different. Marks in the patterns P1, P2, and P3 are arranged in a matrix of 9×7. A pitch in the row direction and a pitch in the column direction in the arrangements are preferably set as being equal.

In the first embodiment, the pattern P1 of the calibration tool 190 is used for calibration of the camera 170, the pattern P2 is used for calibration of the camera 175, and the pattern P3 is used for calibration of the camera 165.

Figure 4:
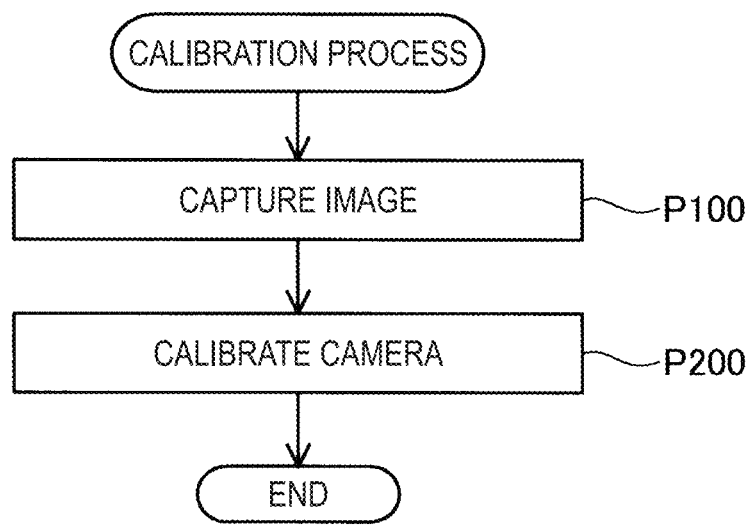
FIG. 4 is a flowchart illustrating a calibration process.

FIG. 4 is a flowchart illustrating a calibration process. When a worker instructs the robot 100 to start calibration and the calibration process is started, the processor 210 causes the cameras 170, 175, and 165 to capture images including the calibration tool 190 (Step S100). Thereafter, the processor 210 calibrates each of the cameras 170, 175, and 165 using the patterns P1, P2, and P3 corresponding to the cameras 170, 175, and 165, respectively, of the captured images (Step S200). Specifically, in a state in which the arm 160 on which the calibration tool 190 is installed has a plurality of positions and attitudes, the cameras 170, 175, and 165 are caused to capture an image including the calibration tool 190 and calibration is performed using the images of the patterns corresponding to the cameras 170, 175, and 165, respectively, among the patterns formed on the calibration tool 190 captured in the images. The position and attitude means a state defined by three coordinate values in a three-dimensional coordinate system and rotation around each coordinate axis. After the camera is calibrated (Step S200), the calibration process is terminated.

According to the first embodiment described above, in a case where the first camera and the second camera are calibrated which are different in at least one of the angle of view and a focal length, calibration work can be performed without replacing the calibration plate for each camera. Accordingly, it is possible to suppress complication of calibration work.

Patterns P1, P2, and P3 having circular marks of the same shape and different sizes of the marks are formed on the calibration tool 190 that is a calibration tool used in the calibration method of the first embodiment. For that reason, the cameras 170, 175, and 165 discriminate the patterns P1, P2, and P3 based on the sizes of the marks constituting the pattern, so that the respective cameras can discriminate the patterns used for calibration. For example, the camera 170 can discriminate the pattern P1 having the largest circular mark constituting the pattern from among the patterns P1, P2, and P3 as the pattern P1 and use the pattern P1 for calibration. Similarly, the camera 175 and the camera 165 can also discriminate the patterns P2 and P3 from among the sizes of the circular marks constituting the pattern and use the patterns P2, P3 for calibration.

In the calibration tool 190 which is a calibration tool used in the calibration method of the first embodiment, the patterns P1, P2, and P3 are formed on different surfaces among the surfaces constituting the calibration tool 190. For that reason, it is possible to deal with the calibration of a plurality of cameras by changing the surface of the calibration tool 190 that is imaged by the camera according to the camera to be calibrated.

B. Second Embodiment

Figure 5:
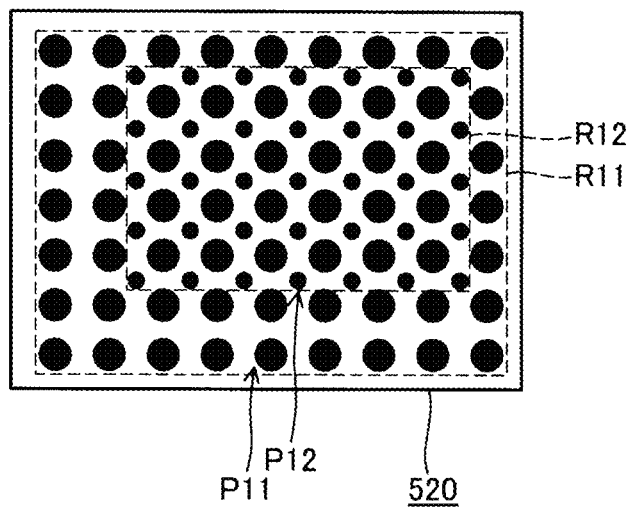
FIG. 5 is an explanatory view illustrating a surface of a calibration tool used in a calibration method of a second embodiment.

FIG. 5 is an explanatory view illustrating a surface 520 on which a pattern P11 and a pattern P12 are formed, of the calibration tool used in a calibration method of a second embodiment. In FIG. 5, the pattern P11 of the calibration tool is used for calibrating the camera 170 and the camera 175 of the robot 100 and a pattern P12 is used for calibrating the camera 165 of the robot 100.

The patterns P11 and P12 are circular shapes having the same mark shape and the sizes of the marks are different. The marks constituting the pattern P11 are larger than the marks constituting the pattern P12. The patterns P11 and P12 are formed on the same surface 520 of the surfaces constituting the calibration tool. A second rectangular region R12 circumscribing the pattern P12 is disposed inside a first rectangular region R11 circumscribing the pattern P11. In the second embodiment, the region R11 is disposed so as to encompass the region R12, but in another embodiment, the region R11 and the region R12 may be disposed such that a portion in one of the regions R11 and R12 overlaps a portion in the other of the regions R11 and R12.

According to the second embodiment described above, the patterns P11 and P12 are formed on the same surface 520 of the surfaces constituting the calibration tool. For that reason, since the patterns P11 and P12 can be imaged without changing the surface of the calibration tool, imaging work of the patterns P11 and P12 can be simplified. Since the region R11 and the region R12 are disposed so as to partially overlap each other, it is possible to reduce the area occupied by the plurality of patterns among the surfaces constituting the calibration tool compared with the calibration tool disposed so that the region R11 and the region R12 do not partially overlap each other.

C. Another Embodiment

Figure 6:
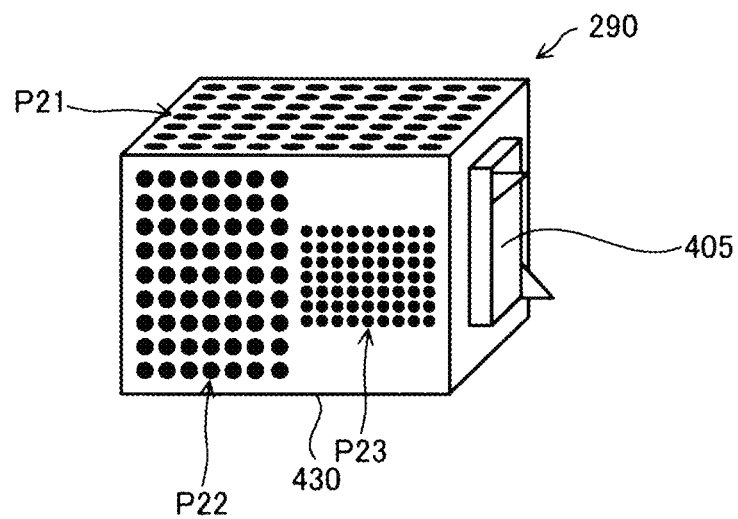
FIG. 6 is an explanatory view illustrating a calibration tool according to another embodiment.

FIG. 6 is an explanatory view illustrating a calibration tool 290 according to another embodiment. The calibration tool 190 installed in the robot 100 that executes the calibration method of the first embodiment includes a joint portion 405, a rod-like member 410, and a plate-like member 420, but the invention is not limited thereto. For example, the calibration tool of the camera included in the robot may be constituted with the joint portion 405 and the box-like member 430, as in the calibration tool 290 illustrated in FIG. 6. Patterns P21, P22, and P23 are formed on the box-like member 430.

Figure 7:
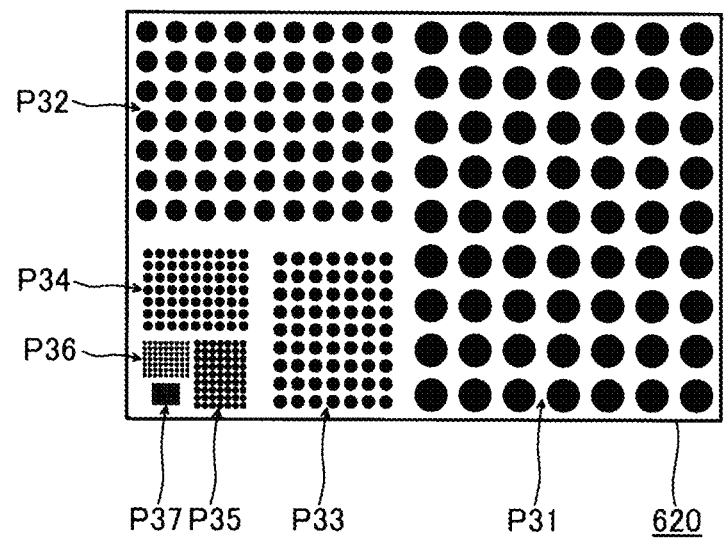
FIG. 7 is an explanatory view illustrating a calibration tool according to still another embodiment.

FIG. 7 is an explanatory view illustrating a surface 620 on which patterns P31, P32, P33, P34, P35, P36, and P37 are formed among the calibration tools of the other embodiment. On the calibration tool illustrated in FIG. 7, seven patterns are formed. Such a calibration tool can be used for calibrating cameras in plural types of robots. As in the calibration tool illustrated in FIG. 7, three or more patterns may be formed on one surface of the surfaces constituting the calibration tool.

The calibration tool 190 installed in the robot 100 that executes the calibration method of the first embodiment described above has the same circular marks arranged in the same matrix and a plurality of patterns having different mark sizes, but the invention is not limited thereto. For example, the calibration tool may have a plurality of patterns in which at least one of mark shape, mark size, and mark arrangement is different. For example, the calibration tool 190 may have a plurality of patterns having the same mark shape, and different mark size and mark arrangement. In such an aspect, it is possible for each camera to discriminate between patterns used for calibration by discriminating the patterns based on the size of the mark and the arrangement of the marks by the camera. As another example, the calibration tool 190 may have a plurality of patterns having the same mark shape and mark size, and different mark arrangement. In such an aspect, the difference in arrangement of marks is used to discriminate between patterns.

The shape of the marks constituting the plurality of patterns included in the calibration tool may be any shape such as a triangular shape, a rectangular shape, or the like. The plurality of patterns provided in the calibration tool may be composed of marks having different shapes for each pattern.

The invention is not limited to the embodiments, examples, and modification examples described above, and can be realized in various configurations without departing from the spirit of the invention. For example, in order to solve some or all of the problems described above or achieve some or all of the effects described above, technical features in the embodiments, examples, and modification examples corresponding to the technical features in the respective forms described in the Summary section can be replaced or combined as appropriate. Also, unless the technical features are described as essential in this specification, the technical features can be deleted as appropriate.

The entire disclosure of Japanese Patent Application No. 2017-147585, filed Jul. 31, 2017 is expressly incorporated by reference herein.

What is claimed is:

1. A calibration method for calibrating a first camera and a second camera which are different in at least one of an angle of view and a focal length, the method comprising:
    capturing images which include a calibration tool having a first pattern configured with a plurality of first marks and a second pattern configured with a plurality of second marks, different in at least one of a shape between the first mark and the second mark, a size between the first mark and the second mark, and arrangement between the first marks and the second marks, by the first camera and the second camera; and
    calibrating the first camera and the second camera using patterns corresponding respectively to the first camera and the second camera.

2. The calibration method according to claim 1,
    wherein in the first pattern and the second pattern, the shape of the first mark and the shape of the second mark are the same and the size of the first mark is different from the size of the second mark.

3. The calibration method according to claim 2,
    wherein in the first pattern and the second pattern, the arrangement of the first marks is different from the arrangement of the second marks.

4. The calibration method according to claim 1,
    wherein the first pattern and the second pattern are formed on the same surface among the surfaces of the calibration tool.

5. The calibration method according to claim 4, wherein in the first pattern and the second pattern, the shape of the first mark and the shape of the second mark are the same and the size of the first mark is different from the size of the second mark, and
a first rectangular region circumscribing the first pattern and a second rectangular region circumscribing the second pattern are disposed so as to partially overlap each other.

6. The calibration method according to claim 1, wherein the first pattern and the second pattern are formed on different surfaces among the surfaces of the calibration tool.

7. A calibration tool used in the calibration method according to claim 1.

8. A calibration tool used in the calibration method according to claim 2.

9. A calibration tool used in the calibration method according to claim 3.

10. A calibration tool used in the calibration method according to claim 4.

11. A calibration tool used in the calibration method according to claim 5.

12. A calibration tool used in the calibration method according to claim 6.

\* \* \* \* \*